United States Patent
Sen et al.

(10) Patent No.: US 11,989,515 B2
(45) Date of Patent: May 21, 2024

(54) ADJUSTING EXPLAINABLE RULES USING AN EXPLORATION FRAMEWORK

(71) Applicant: International Business Machines Corporation, Armonk, NY (US)

(72) Inventors: Prithviraj Sen, San Jose, CA (US); Yiwei Yang, Flushing, NY (US); Yunyao Li, San Jose, CA (US); Eser Kandogan, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 16/805,470

(22) Filed: Feb. 28, 2020

(65) Prior Publication Data
US 2021/0271817 A1 Sep. 2, 2021

(51) Int. Cl.
*G06F 40/289* (2020.01)
*G06F 40/35* (2020.01)
*G06N 3/08* (2023.01)

(52) U.S. Cl.
CPC ............ *G06F 40/289* (2020.01); *G06F 40/35* (2020.01); *G06N 3/08* (2013.01)

(58) Field of Classification Search
CPC .......... G06F 40/289; G06F 40/35; G06N 3/08
See application file for complete search history.

(56) References Cited

U.S. PATENT DOCUMENTS

| | | | |
|---|---|---|---|
| 4,384,329 A * | 5/1983 | Rosenbaum | G06F 40/247 704/10 |
| 5,924,108 A * | 7/1999 | Fein | G06F 40/268 715/267 |
| 6,233,545 B1 | 5/2001 | Datig | |
| 10,275,690 B2 | 4/2019 | Chen et al. | |
| 2007/0112819 A1 * | 5/2007 | Dettinger | G06F 40/35 |

(Continued)

OTHER PUBLICATIONS

Setlur et al., "Eviza: A Natural Language Interface for Visual Analysis," ACM Symposium on User Interface Software and Technology, Oct. 2016, 13 pages.

(Continued)

*Primary Examiner* — Bhavesh M Mehta
*Assistant Examiner* — Edward Tracy, Jr.
(74) *Attorney, Agent, or Firm* — Zilka-Kotab, P.C.

(57) ABSTRACT

A computer-implemented method according to one embodiment includes receiving a plurality of linguistic expressions (LEs); changing one or more conditions of the plurality of linguistic expressions to create an updated plurality of linguistic expressions, utilizing a visual exploration framework (VEF) that visually presents to a user each of the plurality of linguistic expressions; and including the updated plurality of linguistic expressions in a model used to classify input sentences. According to another embodiment, a computer-implemented method includes receiving (i) a set of linguistic expressions (LEs) and (ii) a set of labeled data as input, where the LEs are logical combinations of predicates learned from the labeled data, and each data point in the labeled data comprises a piece of text and ground-truth labels; presenting the LEs in a visual exploration framework; and allowing a user to sort, filter, subset, and select LEs based on different criteria, utilizing the framework.

22 Claims, 15 Drawing Sheets

(56) References Cited

U.S. PATENT DOCUMENTS

| | | | | |
|---|---|---|---|---|
| 2010/0204982 | A1* | 8/2010 | Weng | G10L 15/197 |
| | | | | 704/E15.001 |
| 2013/0212103 | A1* | 8/2013 | Cao | G06F 16/215 |
| | | | | 707/737 |
| 2015/0051900 | A1* | 2/2015 | Kimelfeld | G06F 40/211 |
| | | | | 704/9 |
| 2017/0278510 | A1* | 9/2017 | Zhao | G10L 15/04 |
| 2020/0342354 | A1* | 10/2020 | Inagaki | G06F 40/279 |
| 2021/0157554 | A1* | 5/2021 | Minasyan | G06F 8/24 |
| 2021/0240917 | A1* | 8/2021 | Sen | G06F 40/16 |

OTHER PUBLICATIONS

Srinivasan et al., "Orko: Facilitating Multimodal Interaction for Visual Exploration and Analysis of Networks," Georgia Tech College of Computing, 2017, 11 pages, retrieved from https://www.cc.gatech.edu/~john.stasko/papers/infovis17-orko.pdf.

Zhao et al., "Interactive Visual Data Exploration: A Multi-Focus Approach," Thesis, University of Toronto, 2015, 230 pages.

Anonymous, "Improving Appeal of an Advertisement Based on Linguistic Trends," IP.com Prior Art Database, Technical Disclosure No. IPCOM000252022D, Dec. 13, 2017, 36 pages.

Anonymous, "User interface data visualization and framework for diabetes care," IP.com Prior Art Database, Technical Disclosure No. IPCOM000238307D, Aug. 15, 2014, 20 pages.

Bernstein et al., "Soylent: A Word Processor with a Crowd Inside," Proceedings of the 23nd Annual ACM Symposium on User Interface Software and Technology, 2010, 12 pages.

Chen et al., "AnchorViz: Facilitating Classifier Error Discovery through Interactive Semantic Data Exploration," ACM 23rd International Conference on Intelligent User Interfaces, Mar. 2018, 12 pages.

Cohen et al., "TensorLog: Deep Learning Meets Probabilistic Databases," Journal of Artificial Intelligence Research, 2018, pp. 1-28.

Evans et al., "Learning Explanatory Rules from Noisy Data," Journal of Artificial Intelligence Research, vol. 61, 2018, pp. 1-64.

Hanafi et al., "Synthesizing Extraction Rules from User Examples with SEER," SIGMOD'17, May 2017, pp. 1687-1690.

Jiang et al., "Effective Crowdsourcing for a New Type of Summarization Task," Proceedings of NAACL-HLT, 2018, pp. 628-633.

Kim et al., "Ensemble: Exploring Complementary Strengths of Leaders and Crowds in Creative Collaboration," CSCW 14, Feb. 2014, pp. 11 pages.

Krishnamurthy et al., "SystemT: A System for Declarative Information Extraction," SIGMOD Record, vol. 37, No. 4, Dec. 2008, pp. 7-13.

Lee et al., "SketchExpress: Remixing Animations for More Effective Crowd-Powered Prototyping of Interactive Interfaces," Proceedings of the 30th Annual ACM Symposium on User Interface Software and Technology, Oct. 2017, 12 pages.

Micallef et al., "Interactive Elicitation of Knowledge on Feature Relevance Improves Predictions in Small Data Sets," Proceedings of the 22nd International Conference on Intelligent User Interfaces, Mar. 2017, pp. 1-25.

Pennington et al., "GloVe: Global Vectors for Word Representation," Proceedings of the 2014 Conference on Empirical Methods in Natural Language Processing (EMNLP), Oct. 2014, pp. 1532-1543.

Richardson et al., "Markov logic networks," Machine Learning, vol. 62, 2006, pp. 107-136.

Settles et al., "An Analysis of Active Learning Strategies for Sequence Labeling Tasks," Proceedings of the 2008 Conference on Empirical Methods in Natural Language Processing, Oct. 2008, pp. 1070-1079.

Smith et al., "Closing the Loop: User-Centered Design and Evaluation of a Human-in-the-Loop Topic Modeling System," 23rd International Conference on Intelligent User Interfaces, Mar. 2018, 12 pages.

Snow et al., "Cheap and Fast—But is it Good? Evaluating Non-Expert Annotations for Natural Language Tasks," Proceedings of the 2008 Conference on Empirical Methods in Natural Language Processing, Oct. 2008, pp. 254-263.

Yang et al., "Differentiable Learning of Logical Rules for Knowledge Base Reasoning," 31st Conference on Neural Information Processing Systems, 2017, pp. 1-10.

Muggleton, S., "Learning from positive data," Inductive Logic Programming, 1996, pp. 1-21, retrieved from http://citeseerx.ist.psu.edu/viewdoc/download?doi=10.1.1.119.5121&rep=rep1&type=pdf.

Lasecki et al., "Chorus: A Crowd-Powered Conversational Assistant," Proceedings of the 26th annual ACM symposium on User Interface Software and Technology, Oct. 2013, pp. 1-12.

Grace Period Disclosure, "HEIDL: Learning Linguistic Expressions with Deep Learning and Human-in-the-Loop," Yiwei Yang, Eser Kandogan, Yunyao Li, Walter S. Lasecki and Prithviraj Sen, Jul. 28, 2019, 1 page.

Sherkat et al., "Interactive Document Clustering Revisited: A Visual Analytics Approach," International Conference on Intelligent User Interfaces, Session 3B: Interactive Machine Learning and Analysis, Mar. 2018, pp. 281-292.

Bansal et al., "Updates in Human-AI Teams: Understanding and Addressing the Performance/Compatibility Tradeoff," The Thirty-Third AAAI Conference on Artificial Intelligence, 2019, pp. 2429-2437.

Campero et al., "Logical Rule Induction and Theory Learning Using Neural Theorem Proving," arXiv, 2018, 11 pages, retrieved from https://www.semanticscholar.org/paper/Logical-Rule-Induction-and-Theory-Learning-Using-Campero-Pareja/775a8af075084ac6955623aaf1436b467c02a5a6.

Chiticariu et al., "SystemT: An Algebraic Approach to Declarative Information Extraction," Proceedings of the 48th Annual Meeting of the Association for Computational Linguistics, Jul. 2010, pp. 128-137.

Kulesza et al., "Principles of Explanatory Debugging to Personalize Interactive Machine Learning," Proceedings of the 20th International Conference on Intelligent User Interfaces, 2015, pp. 1-12.

Marcheggiani et al., "Semantic Role Labeling Tutorial," Proceedings of the 2017 Conference on Empirical Methods In Natural Language Processing: Tutorial Abstracts, 2017, pp. 1-2, retrieved from https://www.aclweb.org/anthology/D17-3004/.

Xin et al., "Accelerating Human-in-the-loop Machine Learning: Challenges and Opportunities," SIGMOD '18 DEEM Workshop, 2018, 4 pages, retrieved from https://arxiv.org/abs/1804.05892.

Jurafsky et al., "Speech and Language Processing," Stanford, Third Edition draft, 2019, 621 pages, retrieved from https://web.stanford.edu/~jurafsky/slp3/ed3book.pdf.

Jurafsky et al., "Speech and Language Processing," Draft, AI Prentice Hall Series in Artificial Intelligence, 2009, 1038 pages, retrived from https://github.com/rain1024/slp2-pdf.

* cited by examiner

Rules Available 8.0

- NOUNPHRASE-NonAgentClue_SectionTitle_Category_Table ⓧ
  - VOICE-passive ⓧ
  - precision:1.0000(520/520)  recall:0.3295(520/1578)  f1_score:0.4957

- NONAGENT_theme-NonAgentClue_SectionTitle_Category_Table ⓧ
  - VOICE-passive ⓧ
  - precision:1.0000(396/396)  recall:0.2510(396/1578)  f1_score:0.4012

- MOOD-imperative ⓧ
  - VERBBASE-VerbBase_Category_Table ⓧ
  - precision:0.7835(398/508)  recall:0.2522(396/1578)  f1_score:0.3816

- TENSE-future ⓧ
  - VERBBASE-VerbBase_Category_Table ⓧ
  - precision:0.8182(351/429)  recall:0.2224(351/1578)  f1_score:0.3498

- CONTEXT_manner-Context_Manner_PresentTense_Category_Table ⓧ
  - VERBBASE-VerbBase_Category_Table ⓧ
  - precision:0.8089(326/403)  recall:0.2066(326/1578)  f1_score:0.3291

- NOUNPHRASE-NonAgentClue_SectionTitle_Category_Table ⓧ
  - TENSE-future ⓧ
  - precision:0.9928(274/276)  recall:0.1736(274/1578)  f1_score:0.2956

602

Examples — 604

All communications between the parties regarding this Agreement will be <u>conducted</u> through the parties' representatives as specified in the relevant SOW and/or WA.

All notices required in writing under this Agreement will be <u>made</u> to the appropriate contact(s) listed in the relevant SOW and/or WA and will be effective upon actual receipt.

Notices may be <u>transmitted</u> electronically, by registered or certified mail, or courier.

All notices, with the exception of legal notices, may also be <u>provided</u> by facsimile.

All notices required in writing under this Agreement will be <u>made</u> to the appropriate contact listed below at the following addresses and will be effective upon actual receipt.

Rules Available 83

NONAGENT_theme-NonAgentClue_SectionTitle_Category_Table ⓧ  [+] [−] [Examples] [Effect] [Inspect]
VOICE-passive ⓧ
precision:1.0000(396/396)   recall:0.2510(396/1578)   f1_score:0.4012

Selected: NONAGENT_theme-NonAgentClue_SectionTitle_Category_Table ⓧ   [Replace and Add] [Cancel]
Dropped: VOICE-passive ⓧ — 704
Precision:1.0000 (396/396) --> 0.4695 (400/852) ▼
Recall:0.2510 (396/1578) --> 0.2535 (400/1578) ▲
F1 Score:0.4012 --> 0.3292 ▼

TENSE-future ⓧ  [+] [−] [Examples] [Effect] [Inspect]
VERBBASE-VerbBase_Category_Table ⓧ
precision:0.8182(351/429)   recall:0.2224(351/1578)   f1_score:0.3498

NOUNPHRASE-NonAgentClue_SectionTitle_Category_Table ⓧ  [+] [−] [Examples] [Effect] [Inspect]
TENSE-future ⓧ
precision:0.9928(274/276)   recall:0.1736(274/1578)   f1_score:0.2956

NOUNPHRASE-NonAgentClue_SectionTitle_Category_Table ⓧ  [+] [−] [Examples] [Effect] [Inspect]
VOICE-passive ⓧ
TENSE-future ⓧ

Communication

1402 — Receive a Set of Linguistic Expressions (LEs) and a Set of Labeled Data as Input, Where the Linguistic Expressions are Logical Combinations of Predicates Learned from the Labeled Data, and Each Data Point in the Labeled Data Comprises an Instance of Text and Associated Ground-Truth Labels

1404 — Present the Linguistic Expressions In a Visual Exploration Framework, Where the Framework Allows a Human User to Sort, Filter, Subset, and Select Linguistic Expressions Based On Different Criteria

1406 — Allow the User to Sort, Filter, Subset, and Select LEs Based On Different Criteria, Utilizing the Visual Exploration Framework

FIG. 14

ADJUSTING EXPLAINABLE RULES USING AN EXPLORATION FRAMEWORK

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURE(S): ["HEIDL: Learning Linguistic Expressions with Deep Learning and Human-in-the-Loop," Yiwei Yang, Eser Kandogan, Yunyao Li, Walter S. Lasecki and Prithviraj Sen, Jul. 28, 2019].

BACKGROUND

The present invention relates to predictive models, and more specifically, this invention relates to deploying and editing predictive models.

Predictive models are applied to a wide variety of modern-day applications, such as related product identification, spam email identification, etc. However, current predictive models are unintelligible to human users or equivalent processes/applications, which make such models difficult to view, understand, and modify. As a result, additional computing resources are needed to interact with such predictive models, and predictive models may not be optimized or produced efficiently because they are too difficult to understand.

SUMMARY

A computer-implemented method according to one embodiment includes receiving a plurality of linguistic expressions (LEs); changing one or more conditions of the plurality of linguistic expressions to create an updated plurality of linguistic expressions, utilizing a visual exploration framework (VEF) that visually presents to a user each of the plurality of linguistic expressions; and including the updated plurality of linguistic expressions in a model used to classify input sentences.

According to another embodiment, a computer program product for adjusting explainable rules using a visual exploration framework (VEF) includes a computer readable storage medium having program instructions embodied therewith, where the computer readable storage medium is not a transitory signal per se, and where the program instructions are executable by a processor to cause the processor to perform a method including receiving, utilizing the processor, a plurality of linguistic expressions (LEs); changing, utilizing the processor, one or more conditions of the plurality of linguistic expressions to create an updated plurality of linguistic expressions, utilizing a visual exploration framework (VEF) that visually presents to a user each of the plurality of linguistic expressions; and including, utilizing the processor, the updated plurality of linguistic expressions in a model used to classify input sentences.

According to another embodiment, a system includes a processor; and logic integrated with the processor, executable by the processor, or integrated with and executable by the processor, where the logic is configured to receive a plurality of linguistic expressions (LEs); change one or more conditions of the plurality of linguistic expressions to create an updated plurality of linguistic expressions, utilizing a visual exploration framework (VEF) that visually presents to a user each of the plurality of linguistic expressions; and include the updated plurality of linguistic expressions in a model used to classify input sentences.

According to another embodiment, a computer-implemented method includes receiving (i) a set of linguistic expressions (LEs) and (ii) a set of labeled data as input, where the LEs are logical combinations of predicates learned from the labeled data, and each data point in the labeled data comprises a piece of text and ground-truth labels; presenting the LEs in a visual exploration framework; and allowing a user to sort, filter, subset, and select LEs based on different criteria, utilizing the visual exploration framework.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 6 illustrates an exemplary visual exploration framework (VEF) that provides linguistic expression (LE) examples, in accordance with one embodiment of the present invention.

FIG. 7 illustrates an exemplary visual exploration framework (VEF) that provides linguistic expression (LE) editing, in accordance with one embodiment of the present invention.

FIG. 14 illustrates a method for implementing a visual exploration framework, in accordance with one embodiment of the present invention.

DETAILED DESCRIPTION

Figure 1:
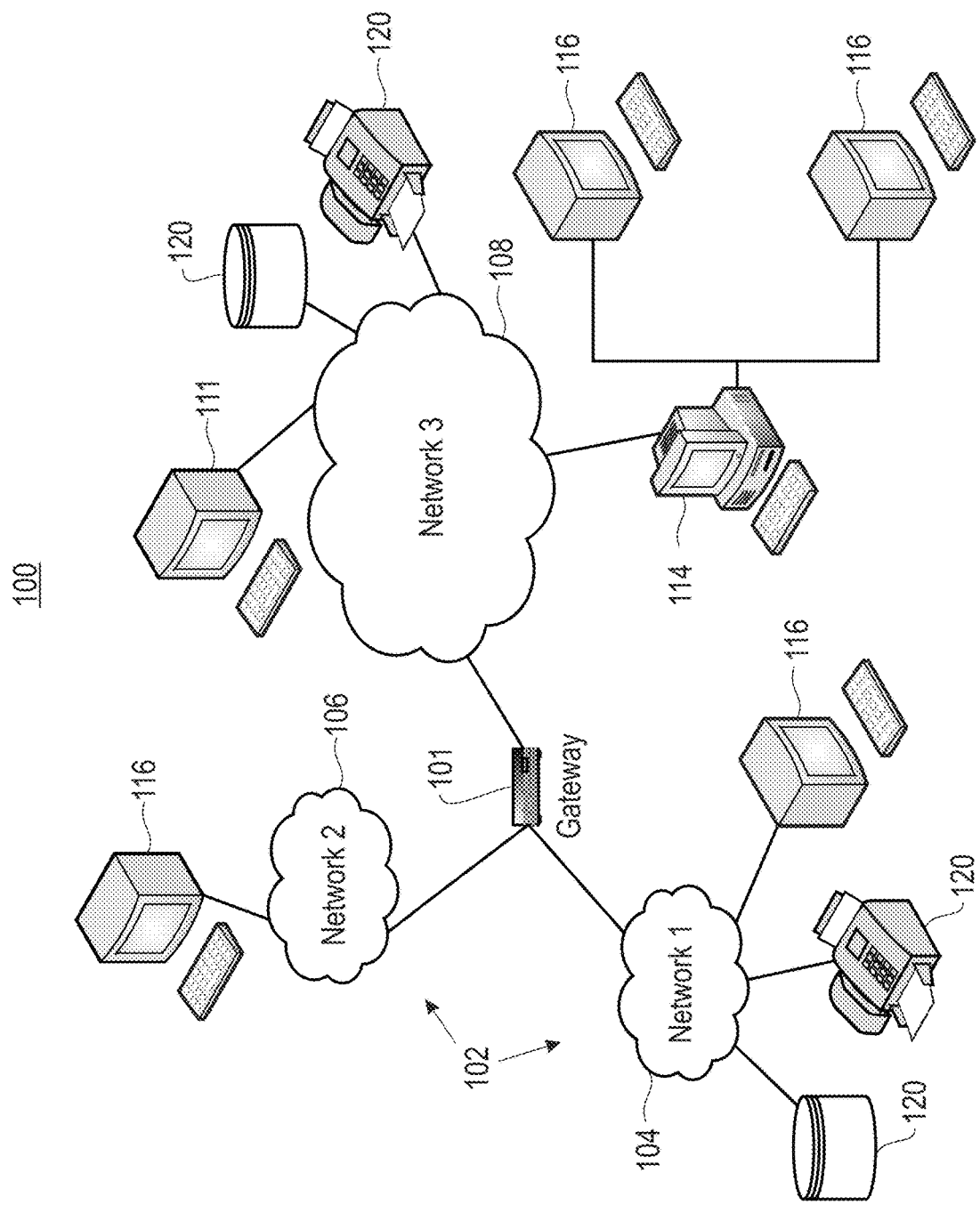
FIG. 1 illustrates a network architecture, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for adjusting explainable rules using an exploration framework.

In one general embodiment, a computer-implemented method includes receiving a plurality of linguistic expressions (LEs); changing one or more conditions of the plurality of linguistic expressions to create an updated plurality of linguistic expressions, utilizing a visual exploration framework (VEF) that visually presents to a user each of the plurality of linguistic expressions; and including the updated plurality of linguistic expressions in a model used to classify input sentences.

In another general embodiment, a computer program product for adjusting explainable rules using a visual exploration framework (VEF) includes a computer readable storage medium having program instructions embodied therewith, where the computer readable storage medium is not a transitory signal per se, and where the program instructions are executable by a processor to cause the processor to perform a method including receiving, utilizing the processor, a plurality of linguistic expressions (LEs); changing, utilizing the processor, one or more conditions of the plurality of linguistic expressions to create an updated plurality of linguistic expressions, utilizing a visual exploration framework (VEF) that visually presents to a user each of the plurality of linguistic expressions; and including, utilizing the processor, the updated plurality of linguistic expressions in a model used to classify input sentences.

In another general embodiment, a system includes a processor; and logic integrated with the processor, executable by the processor, or integrated with and executable by the processor, where the logic is configured to receive a plurality of linguistic expressions (LEs); change one or more conditions of the plurality of linguistic expressions to create an updated plurality of linguistic expressions, utilizing a visual exploration framework (VEF) that visually presents to a user each of the plurality of linguistic expressions; and include the updated plurality of linguistic expressions in a model used to classify input sentences.

In another general embodiment, a computer-implemented method includes receiving (i) a set of linguistic expressions (LEs) and (ii) a set of labeled data as input, where the LEs are logical combinations of predicates learned from the labeled data, and each data point in the labeled data comprises a piece of text and ground-truth labels; presenting the LEs in a visual exploration framework; and allowing a user to sort, filter, subset, and select LEs based on different criteria, utilizing the visual exploration framework.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
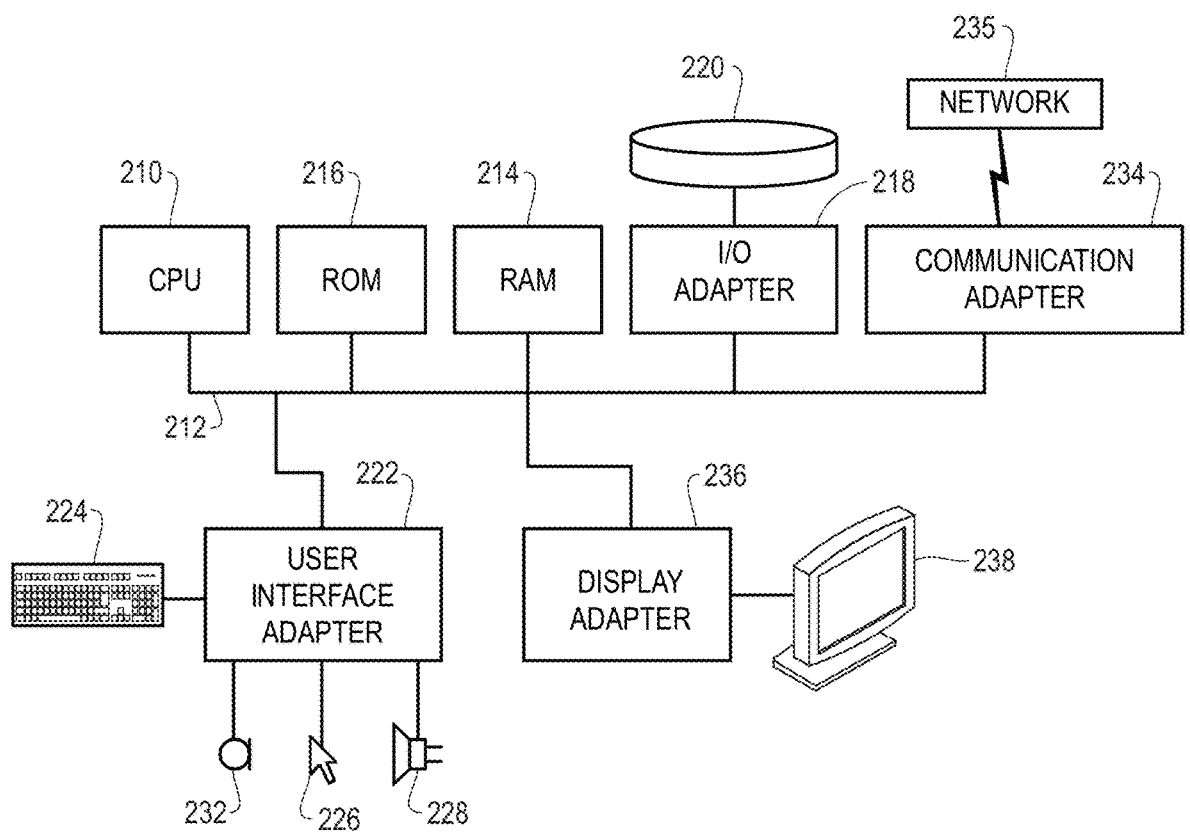
FIG. 2 shows a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. This figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
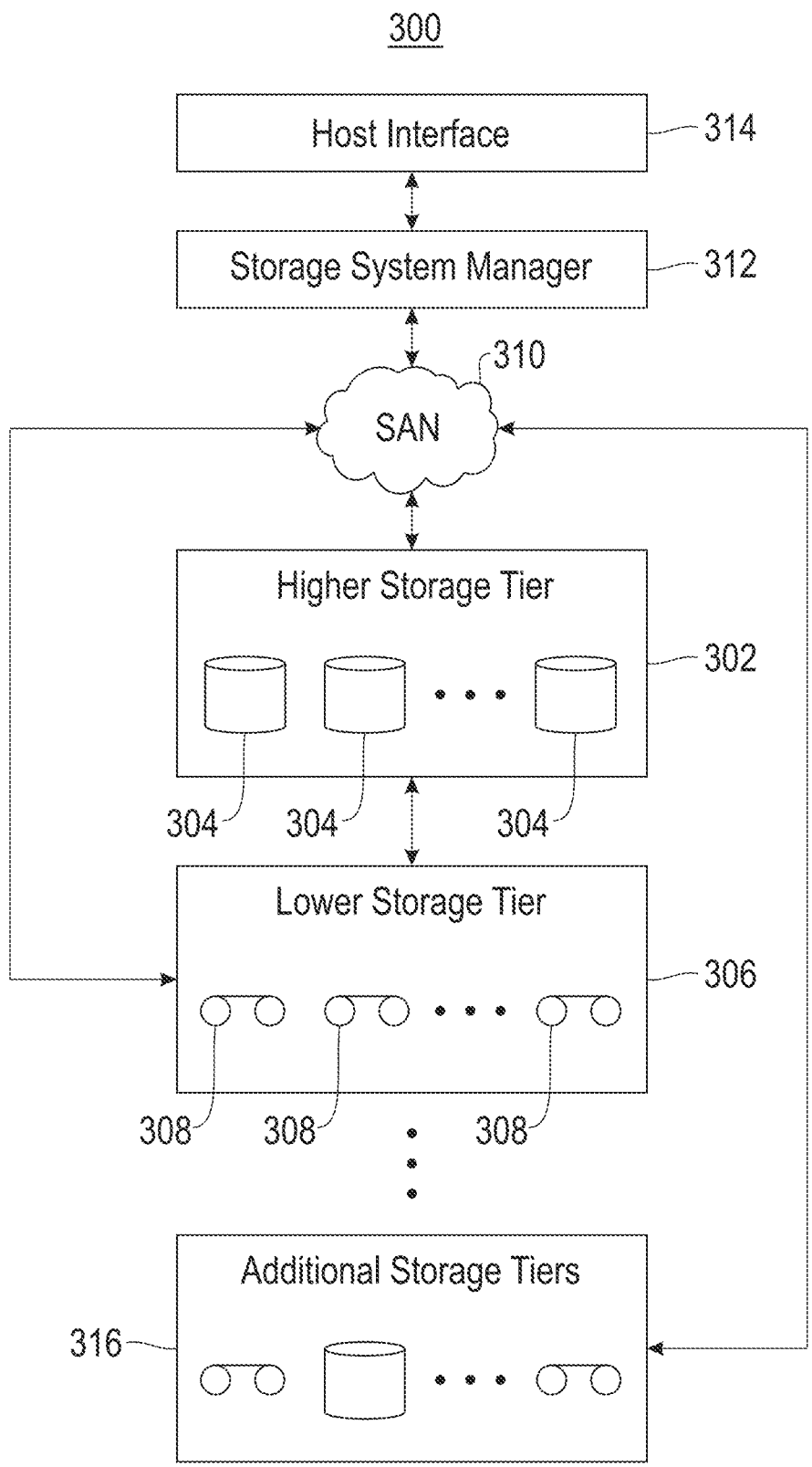
FIG. 3 illustrates a tiered data storage system in accordance with one embodiment of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302 may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Learning Explainable Classification Rules with Neural Logic Programming

While statistical modeling techniques have successfully tackled many applications, such models rarely lend themselves to easy interpretation. Using a real-world sentence classification use-case, it is possible to learn accurate models comprising higher-order abstractions expressed in a dialect with human-understandable semantics such as first-order logic. A neural network is provided that efficiently explores the space of relaxed formulas to learn rules that best explain the noisy labels in the data.

For many enterprise applications, interpretability of the learned model is very important. Especially when predictions affect revenue, the deployment of such a model to a customer-facing application is contingent upon an in-depth understanding of its inner workings and how much liability it can incur due to issues such as fairness. Deep learning has enabled learning of progressively larger models and attaining an in-depth understanding has become harder still. Explaining a prediction requires understanding the interplay among (possibly) millions of learned parameters—a daunting challenge to say the least.

Figure 4:
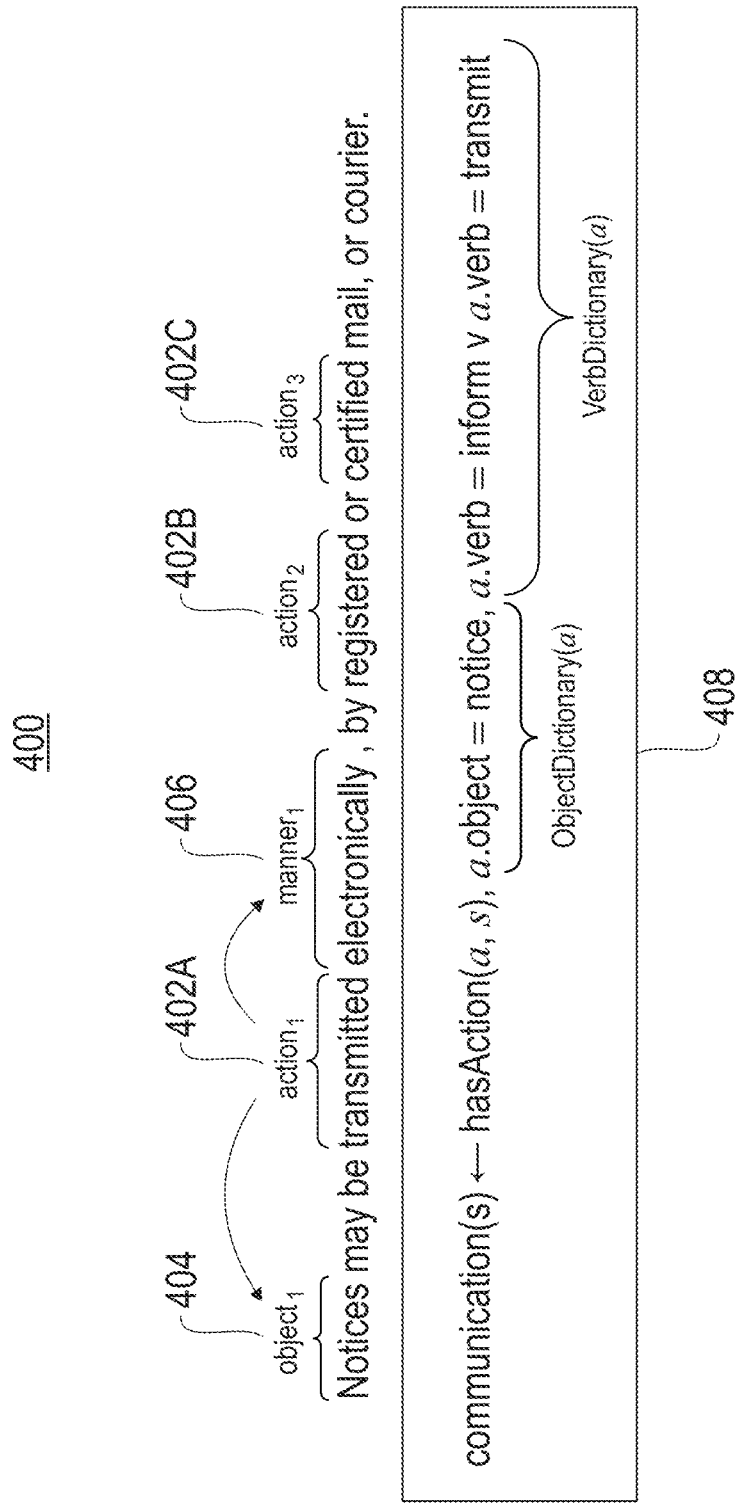
FIG. 4 illustrates a sentence from a real-world, legal contract along with its high-level linguistic abstractions extracted using semantic role labeling, in accordance with one embodiment of the present invention.

FIG. 4 illustrates a sentence 400 from a real-world, legal contract along with its high-level linguistic abstractions 402-406 extracted using semantic role labeling, according to one exemplary embodiment. The sentence 400 consists of three actions (or verbs) 402A-C for which we also show the relevant arguments such as its manner 406 (how the action is performed) and object 404 (what is the action referring to).

In one embodiment, a desired operation may include labeling communicative sentences, i.e., assigning the label communication to a sentence if it describes information exchange between the two parties involved in the contract. FIG. 4 shows a rule 408 that checks for three conditions:
1) The action should belong to the sentence,
2) its object should form a match with a dictionary of objects, and 3) the surface form of the action should form a match with a dictionary of verbs.

The rule 408 evaluates to true on the sentence 400 because one of its constituent actions satisfies all the specified conditions. Despite the sentence containing a multitude of actions, attribution is clear since the rule only holds true for action1 702A. Moreover, due to the transparency and potential for explanation offered by rules, even for a domain expert who may not understand the learning algorithms employed, as long as they understand first-order logic and linguistic constructs, it is feasible for them to interpret such rules and modify them so as to achieve a desired behavior.

As opposed to statistical models, explainable models expressed in a dialect with clear semantics such as first-order logic have many advantages including but not limited to enabling:
1) verification of model semantics,
2) model improvement if feedback, e.g., label corrections, is available, and
3) lower label complexity due to the strong inductive bias imposed by precise language semantics.

While inductive logic programming (ILP) focuses on learning logic programs, it is brittle: Unless there exists a set of logical rules that entails all positive examples and rejects the negatives, no rule is learned. Neuro-symbolic and neural network-based approaches are too computationally expensive or are not directly applicable for learning classification rules.

In one embodiment, rules for classification tasks may be learned. A logical rule may include a binary classifier whose head, the label relation, holds true if the instance satisfies the body predicates. A restricted rule may be implemented having a structure that not only allows for classifying independent and identically distributed (IID) instances but also collective classification, wherein features of related instances may be exploited.

Explainable Classification Rules

In one embodiment, the problem setting may be provided to describe how rules can help. Let $D=\{(x_1,y_1), \ldots (x_n,y_n)\}$ denote a binary class, labeled sample such that each $x_i$ denotes an instance to be classified with label $y_i \in \{0, 1\}$. One goal may be to learn a function that assigns $x_i$ its label $y_i$, and because statistical classifiers, e.g. logistic regression and even neural networks, can be lacking when it comes to interpretability, first-order logic rules may be used.

Before describing the notation, the problem setting may be explained. In particular, the IID setting as well as settings where $x_i$ may be related to other instances $x_j$ are considered.

Let $P=\{pred_1, \ldots pred_m\}$ denote a set of predicates where $pred(x_1, \ldots x_n) \in \{\top, \bot\}$ is an n-ary ground atom that evaluates to either true ($\top$) or false ($\bot$) if $x_i$ is a constant for all $i=1 \ldots n$; otherwise $x_i$ can be a logical variable that takes values from a domain of constants Dom. The central construct in a logic program is an if-then rule or clause:

$$R:h \leftarrow b_1, b_2, \ldots b_n,$$

where R is an identifier for the clause, $b_1, \ldots b_n$ denote its body such that $b_i \in P$, $\forall i=1, \ldots n$, and h denotes the head predicate. If the body is true then the head is also true, which in the context of classification, will usually be the label predicate $\ell(x)$ which, in turn, when true implies that y=1. In one embodiment, clauses may be treated as binary classifiers. Usually, the goal is to learn not one but multiple clauses. Under the usual disjunctive semantics, all clauses that share the same head can be collapsed to one overall rule in disjunctive normal form (DNF):

$$\ell \leftarrow R_1 \lor \ldots \lor R_k \quad (1)$$

In the sequel, a focus may be made on learning clauses involving a binary predicate $r(x_1, x_2)$ that is true if instances $x_1$ and $x_2$ are related (instances are referred to as logical constants). In the above example, link( ) performs the role of r( ). Another special case of the framework is multiple instance learning where related instances of $x_i$ and $x_j$ form disjoint subsets of D $\forall$i, j.

FIG. 7 is an instance of MIL since sentences are related to their constituent actions and an action of one sentence cannot be related to another sentence. IID classification ($R_1$ above) is also a special case since it can be represented with the identity relation such that $r(x_i,x_j)$ is true iff i=j. Especially in cases where predicates are automatically generated and form weak predictors (in the sense that when used on their own to predict labels they lead to low precision and potentially many false positives), it helps to form conjunctions of a multitude of them so as to improve precision. One goal is to learn clauses whose body consists of $r(x, x')$, $\bigwedge_i pred_i(x')$ where $pred_i \in P$, $\forall$ Vi. The core learning task can now be stated as $$\operatorname*{argmax}_{R_1, \ldots R_k} \sum_{(x,y) \in \mathcal{D}} y\delta(\ell(x)) + (1-y)(1-\delta(\ell(x))) \quad (2)$$

such that:

$$R_i : \ell(x) \leftarrow r(x, x'), \bigwedge_{j=1}^{m} pred_j^i(x'), \forall i = 1, \ldots k$$

$$pred_j^i \in \mathcal{P}, \forall j = 1, \ldots m, \forall i = 1, \ldots k$$

where $\delta(z)$ is 1 if z is true and 0 otherwise, and k (number of clauses) and m (maximum number of predicates per clause) denote user-defined parameters. Note that, the same predicate may be allowed to be repeated within a clause and across clauses, thus allowing clauses of varying length ($\because p \land p = p$).

Learning Explainable Classification Rules with Neural Networks

To enable the use of statistical techniques for learning rules, the setting is recast into linear algebra notation. Given an instance $x_i$, let $\phi^i$ denote a binary-valued matrix whose columns correspond to predicates and rows correspond to related instances $R_i = \{x_j | r(x_i, x_j)\}$. More precisely, $$\phi^i \in \{0,1\}^{|R_i| \times |P|},$$

such that its (j, k)-th cell, $\phi_{j,k}^i$, is 1 if the jth related instance satisfies the kth predicate in P, and 0 otherwise. Arbitrary connectivity patterns are allowed among instances in r and in particular, it may be the case that $|R_i| \neq |R_j|$ for some $i \neq j$ (e.g., different sentences may contain a differing number of actions or different publications may contain a different number of citations). Such a matrix $\phi^i$ can be used to represent common logical operations.

For instance, let $\alpha^{pred} \in \{0\ 1\}^{|P|}$ denote a one-hot encoding vector for pred $\in$ P whose only 1 is in the pred-th position, then the matrix-vector multiplication $\phi^i \alpha^{pred}$ returns a vector whose jth cell is 1 if the jth related instance satisfies pred and 0 otherwise. Moreover, logical conjunction and disjunction can be expressed using element-wise operations:

$$\{p(x_j) \land p'(x_j) | r(x_i, x_j)\} \equiv (\phi^i \alpha^p) \circ (\phi^i \alpha^{p'})$$

$$\{p(x_j) \lor p'(x_j) | r(x_i, x_j)\} \equiv \max(\phi^i \alpha^p, \phi^i \alpha^{p'})$$

where ○ denotes element-wise or Hadamard product and max denotes element-wise or cell-wise maximum between two vectors. The first and second operations compute the conjunction and disjunction of the responses of predicates p, p'∈P for each related instance, respectively.

Using these definitions of logical operations and given a clause $R:r(x,x') \wedge p_1(x') \wedge \ldots \wedge p_m(x')$, R's evaluation on instance $x_i$ denoted $R(x_i)$ may be expressed as:

$$R(x_i) = \max(\phi^i \alpha^{p_1}) \circ \ldots \circ (\phi^i \alpha^{p_m}).$$

where max selects the largest entry in the vector returned by the element-wise products. The above expression returns 1, iff instance x is related to an instance that satisfies all predicates $p_1$ through $p_m$.

With this machinery in place, we can now express Equation 2 in linear algebra notation:

$$\underset{\alpha_j^i}{\mathrm{argmax}} \sum_{(\phi,y) \in \mathcal{D}} (2y-1) \max_{i=1,\ldots k} \overline{\max_{j=1,\ldots m} \circ (\phi \alpha_j^i)}^{\text{evaluation } R_i \text{ on } \phi} \quad (3)$$

$$\text{such that:} \mathbb{1} \, \alpha_j^i = 1, \alpha_j^i \in \{0,1\}^{|P|}, \forall \, 1 \le j \le m, \forall \, 1 \le i \le k$$

where $\mathbb{1}$ denotes a row of 1 s. This objective learns clauses $R_1, \ldots R_k$, each modeled using m one-hot encodings $\alpha_1^i, \ldots \alpha_m^i$ that constitute the learnable parameters, such that positive instances (y=1) are assigned higher scores than negative instances (y=0).

As noted in Equation 1, the k clauses form a DNF to model the target relation $\ell(x)$ (represented by $\max_{i=1 \ldots k}$ in the objective). This learning objective may enforce one-hot constraints, i.e., $\alpha_j^i \in \{0,1\}^{|P|}$, and training with relaxed, non-negativity constraints where only $\alpha_j^i$ is enforced forms a legal distribution, i.e., $\mathbb{1} \alpha_j^i = 1, \alpha_j^i \ge 0$, may also be used.

Also, as a matter of notational convenience, $\{\alpha_j^i\}_{i=1}^k$ may be packed as columns of matrix $\forall_j \in [0,1]^{|P| \times k}$ which allows replacement of the two max's in the objective into a single max that retrieves the largest entry from the matrix computed by $(\phi \forall_1) \circ \ldots \circ (\phi \forall_m)$. A neural network may then be devised that can employ standard gradient based optimization techniques to learn clauses.

Figure 5:
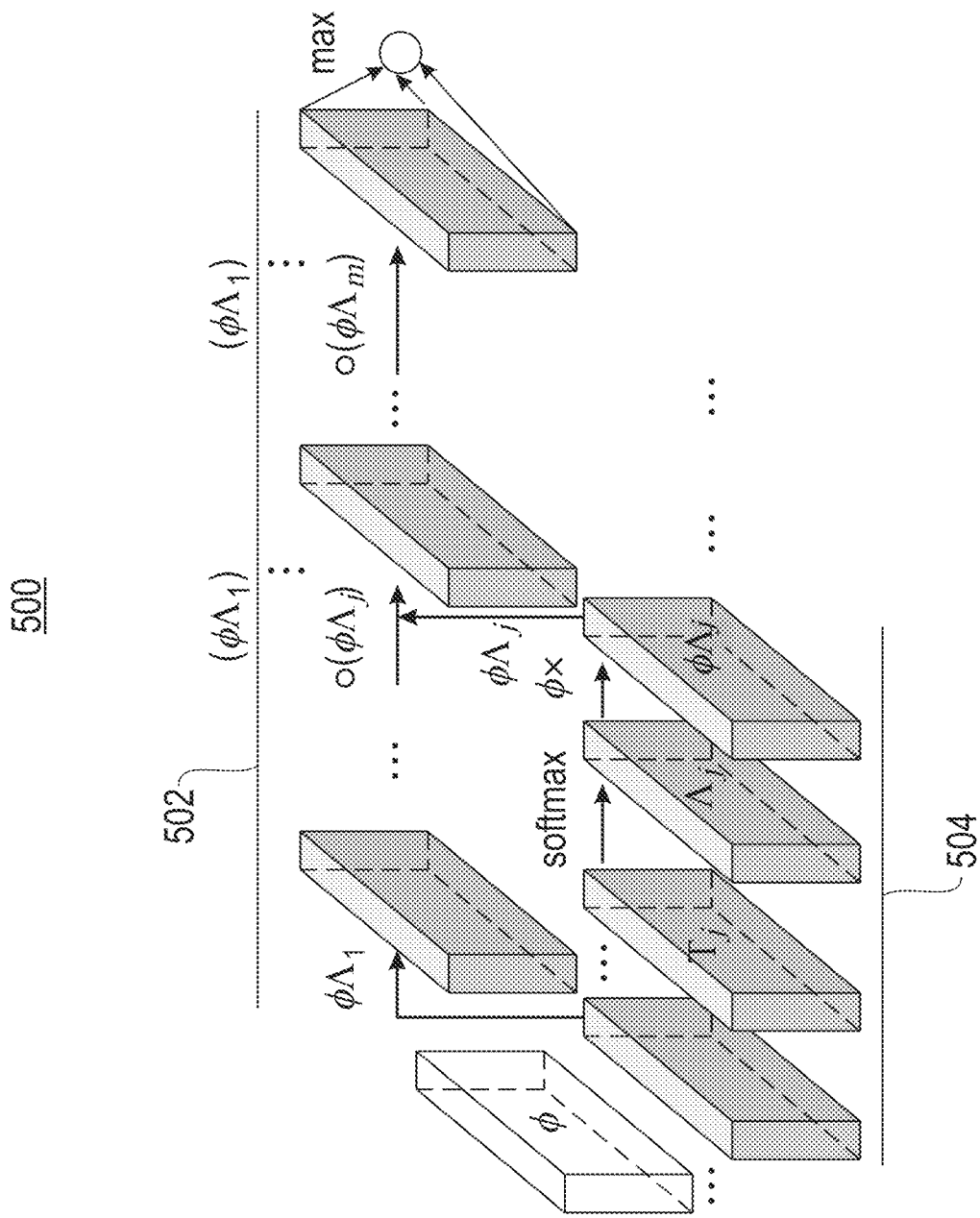
FIG. 5 illustrates an exemplary neural network for learning classification rules, in accordance with one embodiment of the present invention.

FIG. 5 shows an exemplary neural network 500 for learning classification rules that has an upper branch 502 and a lower branch 504. Given φ from D which forms the input, each jth subsequent layer in the upper branch 502 computes conjunctions up until the jth predicate for all k clauses being learned. This is achieved by using the lower branch to compute all $\alpha_j^i$, $\forall i=1, \ldots k$, from auxiliary variables $\gamma_j^i$, $\forall i=1, \ldots, k$, using a softmax transformation that ensures $\alpha_j^i$ is a legal distribution.

More precisely, let $\Gamma_j \in \mathbb{R}^{|P| \times k}$ denote a matrix of auxiliary parameters whose ith column contains $\gamma_j^i$ and $\Lambda_j \in [0,1]^{|P| \times k}$ whose ith column contains and $\alpha_j^i$ such that softmax$(\gamma_j^i) = \alpha_j^i$. The corresponding jth hidden layer in the upper branch then:

1) Computes $\phi \Lambda_j$ which produces an $|R| \times k$ matrix where R denotes the set of related instances for input φ, and
2) Hadamard products it with the conjunctions for all clauses up until the (j−1)th predicate produced by the previous layer.

$(\phi \Lambda_1) \circ \ldots \circ (\phi \Lambda_m)$ produced by the last layer is then max-pooled into a single value, coalescing both inner and outer max operations in Equation 3. Gradients computed via backpropagation are used to update $\Gamma_j$, that are then used to re-compute $\Lambda_j$ for the next iteration. For inference, the portion of the network referring to $\Gamma_j$, $\forall j=1, \ldots, m$ is removed, and the remainder is invoked with the learned $\Gamma_j$, $\forall j=1, \ldots, m$.

As shown above, a specific kind of rule may be devised to solve a task of general interest (classification) that can represent well known classification tasks as special cases (e.g., multiple instance learning, collective classification). Accurate rules may be learned while scaling up to real-world problem sizes.

In one embodiment, semantic linguistic structures may be used from natural language processing (NLP). Sentences may be broken down into high-level structures, such as verbs and their arguments doer/object/manner, verb properties such as tense, voice, etc. Linguistic structures can then be used to define predicates. The neural network may accept an input sentence in terms of its constituent verbs and how they respond to such predicates.

Learning Linguistic Expressions with Deep Learning and Human-In-the-Loop

Machine learning (ML) is an iterative process where ML experts decide which features to include, hyperparameters to tune, metrics to evaluate, and whether the desired level of quality has been attained. Traditionally, to understand a predictive model one usually begins by examining the model's predictions with little understanding of the inner workings of the learned, black-box model. More transparent representations of predictive models, such as first order logic (a dialect with human-interpretable semantics), enables an understanding of the inner workings of the learned model, but traditional approaches to learning these representations fail to learn anything unless a logic program exists that can perfectly separate data according to its labels.

Human-in-the-loop machine learning (HITLML) approaches aim to provide humans with the ability to interact with the model that goes beyond simply examining model predictions. Humans need to be able to interpret, explain, and reason about models throughout the model development cycle. In domains where labeled training data are too limited to learn a model that generalizes well to unseen data, humans need to be able to interpret and examine machine learning models.

In one embodiment, a machine-learned model may be exposed through abstract, semantic, explainable rules, and humans and domain experts may examine, interact, and modify the model logic directly. A system may be designed to help domain experts access linguistic expressions or rules learned via deep learning. Such a system may illustrate text analytics, allow inspection of expressions/rules, expose how such expressions/rules operate on examples, and even break the expressions/rules apart into their constituent predicates. New predicates may also be added to create new expressions in the process. This may enable domain experts to instill their expertise into a machine-learned model, which may result in a model having superior generalization performance.

Semantic Linguistic Structure (SLS)

Each SLS refers to the shallow semantic representations corresponding to each sentence that are generated automatically with natural language processing techniques such as semantic role labeling and syntactic parsing. Each structure captures "who is doing what to whom, when, where and how" described in a sentence. One example of an SLS is shown below:

| John | bought | daisy | for | Mary | yesterday |
|------|--------|-------|-----|------|-----------|
| agent | action | theme | | beneficiary | context:temporal |

SLSs may be used as predicates to form linguistic expressions. For sentence classification, SLSs may be extracted using a semantic role labeler that identifies actions/verbs and various arguments of the action, such as an agent (e.g., a doer of the action) and object of the action and manner in which it is performed.

From these, predicates are constructed. The predicates may test properties of the action such as tense, aspect, mood, modal class, voice and polarity. The predicates may be generated by looking up elements such as extracted verbs (bases), agents, and objects in dictionaries. For example, hand-crafted dictionaries may contain surface forms for verbs (bases), objects, themes, etc.

Deep Learning Linguistic Expressions

In one embodiment, a weighted rules model representation may be used to describe the input to the visual exploration framework. Given predicates P={$pred_1 \ldots pred_m$} and binary class labeled data D={$(x_1; y_1) \ldots (x_n; y_n)$} such that each label $y_i \in \{0, 1\}$ and $x_i$ denotes a sentence, the weighted rules model associates a non-negative weight with each rule or linguistic expression, as follows:

$$w_1 : \ell(x) \leftarrow pred_1^1(x) \wedge \ldots pred_{k_1}^1(x)$$
$$\vdots$$
$$w_N : \ell(x) \leftarrow pred_1^N(x) \wedge \ldots pred_{k_N}^N(x)$$

Intuitively, if sentence x satisfies a linguistic expression, then x inherits the corresponding weight; the higher the weight, the greater the chance of the sentence being assigned the label, i.e., $\ell$, is true. While learning a model based on logic provides strong inductive bias that can help regularize the learned model and better generalize to unseen data, the risk of overfitting is not completely eliminated due to limited labeled data in many real-world applications (e.g., enterprise settings where privacy and proprietary ownership restricts the size of the training set). Moreover, the presence of weights can hamper the ability to comprehend the expression since humans are much better at interpreting logical expressions.

In one embodiment, a weighted rules model may be modified to be fully explainable and more generalizable. The model may include a set of linguistic expressions following simple yet powerful disjunctive semantics (e.g., an input sentence x may be assigned a label if any of a plurality of expressions associated with the label hold true for it).

User Experience

In one embodiment, users may interact with machine-learned linguistic expressions and facilitate co-operative model development. Users may be presented with a quick overview of learned expressions that enables them to organize, order, and navigate expressions effectively. Additionally, the interface may help users understand each expression's semantics and quality through examples and statistics, and may deepen understanding by providing an interface to verify and modify expressions while examining an impact of those modifications.

Overview, Rank, Filter

Initially, the system presents all machine-learned linguistic expressions along with their precision, recall, and F1 measures (relevant for classification tasks). Users can rank and filter the expressions to organize them for processing. Ranking allows users to quickly see the expressions with high performance on training data, which is especially useful when the list of expressions is large. Filtering allows users to narrow down a large set of expressions to a small set of similar expressions without being overwhelmed. Users can filter expressions by setting a minimum threshold on multiple performance measures. Users can also filter expressions by their constituent predicates. Filtering by predicate is useful when an expression is able to be generalized, and expressions that share common predicates are desired.

Linguistic Expression Selection

One goal of the above implementation is to create a collection of trusted linguistic expressions. To do so, after evaluating an expression, a user may add the expression to an "approved" or "disapproved" collection. When an expression is approved, the combined performance of all approved expressions is recomputed. This may help users to keep track of the progress of approved expressions. To help users assess expressions, a random sample of true positive and false positive matching example sentences may be provided. Each example is adjusted with annotations highlighting the constituent predicates that form part of the expression.

Visual Exploration Framework

A visual exploration framework allows users to inspect and modify linguistic expressions by adding or dropping predicates, and examine the effects of any modifications. While adjusting expressions, users can also examine the "delta" examples. For example, if a predicate is dropped, then the expression becomes more general, thus retrieving more sentences than it previously did. Conversely, if a predicate is added, fewer sentences are retrieved and the visual exploration framework shows examples of this difference. This is beneficial because it allows users to see the effect of individual predicates.

FIG. 6 illustrates an exemplary visual exploration framework (VEF) 600 that provides linguistic expression (LE) examples, according to one exemplary embodiment. As shown, a plurality of linguistic expressions 602 are displayed within the visual exploration framework 600. Upon selection of one of the plurality of linguistic expressions 602, examples 604 may be provided for the selected linguistic expression. For example, sentences that satisfy the linguistic expression may be presented.

FIG. 7 illustrates an exemplary visual exploration framework (VEF) 700 that provides linguistic expression (LE) editing, according to one exemplary embodiment. As shown, upon selection of a linguistic expression 702, a predicate 704 of the linguistic expression 702 may be removed to modify the linguistic expression 702.

Figure 8:
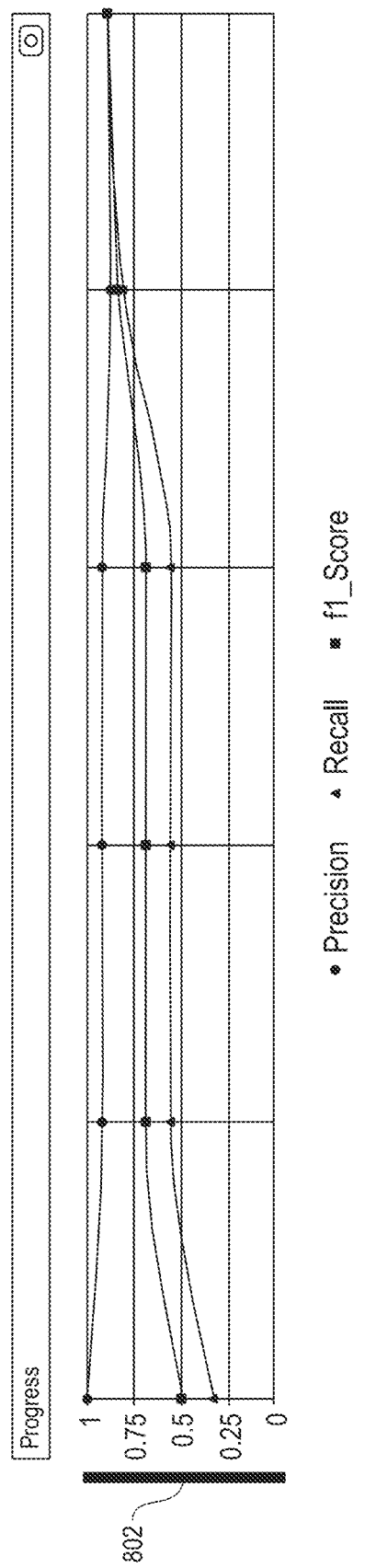
FIG. 8 illustrates an exemplary visual exploration framework (VEF) that displays aggregated metrics, in accordance with one embodiment of the present invention.

FIG. 8 illustrates an exemplary visual exploration framework (VEF) 800 that displays aggregated metrics 802, according to one exemplary embodiment. As shown, as linguistic expressions 804 are added to and removed from a model, metrics 802 associated with the performance of the model (e.g., precision, recall, and F1 score) may be presented via the visual exploration framework 800. This may enable a user to see the impact of an addition or removal of linguistic expressions 804 from the model.

Figure 9:
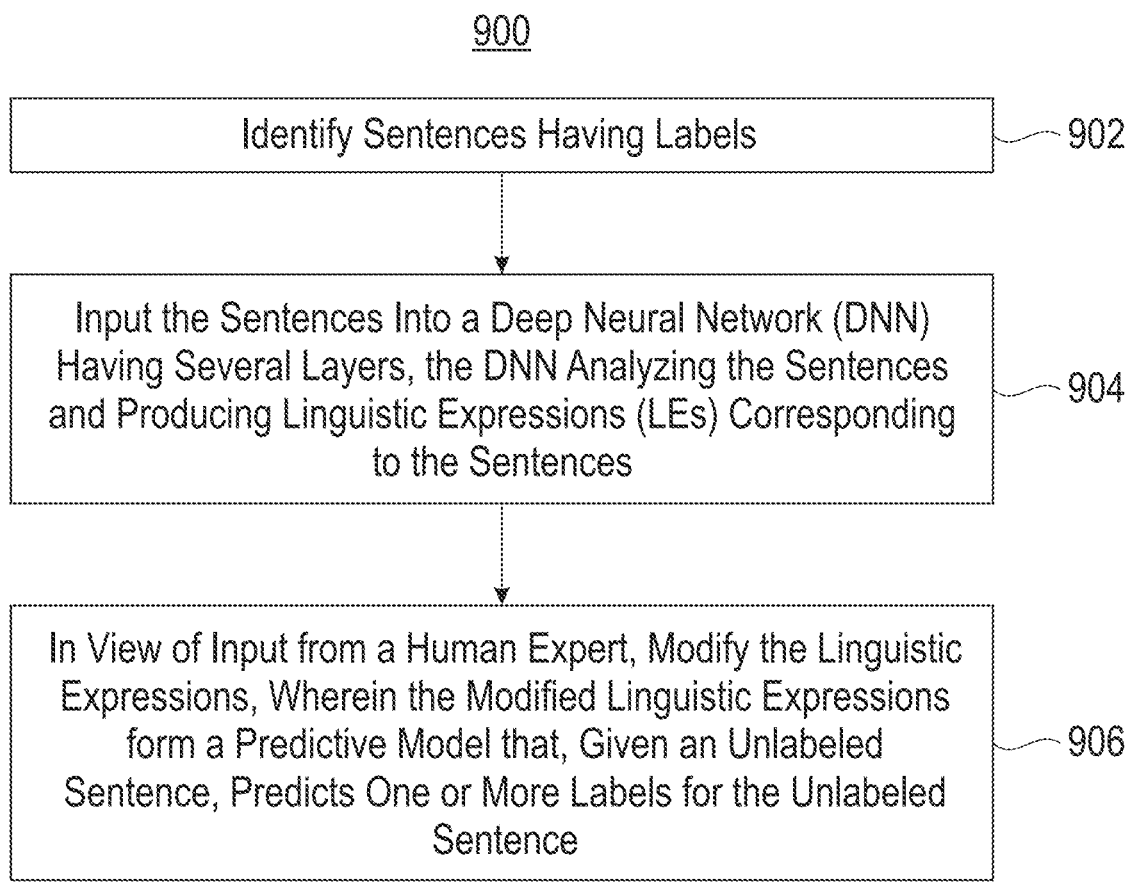
FIG. 9 illustrates a method for training a predictive model, in accordance with one embodiment of the present invention.

Now referring to FIG. 9, a flowchart of a method 900 for training a predictive model is shown according to one embodiment. The method 900 may be performed in accordance with the present invention in any of the environments depicted in FIGS. 1-5, among others. Of course, greater or fewer operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9, method 900 may initiate with operation 902, where sentences having labels are identified. Additionally, method 900 may proceed with operation 904, where the sentences are input into a deep neural network (DNN) having several layers, the DNN analyzing the sentences and producing linguistic expressions (LEs) corresponding to the sentences. In one embodiment, there may not be a one-to-one correspondence between the number of linguistic expressions and the number of sentences. Further, method 900 may proceed with operation 906, where in view of input from a human expert, the linguistic expressions are modified, wherein the modified linguistic expressions form a predictive model that, given an unlabeled sentence, predicts one or more labels for the unlabeled sentence.

In one embodiment, the predictive model undergoes iterative refinement in view of its quality. In another embodiment, the method further includes (a) choosing a subset of sentences and their corresponding labels from the collection of sentences; (b) for each sentence in the subset, feeding it as input to the DNN and propagating it through all of the DNN's layers until its predicted label is obtained as output from the DNN, at which point the predicted label is compared with its correct label, and the corresponding error is computed (the forward pass); (c) backpropagating the computed error to update conditions included in the linguistic expressions (the backward pass); and (d) repeating steps (b) and (c) for one or more additional subsets in the collection of sentences.

In another embodiment, between the input and output layers, the DNN includes an intermediate layer for each condition in the LE. For example, if linguistic expressions having five conditions are to be trained, the network architecture could comprise five layers, excluding the input and output layers.

In yet another embodiment, each of the intermediate layers is responsible for identifying a condition to include into the LE. In another embodiment, a collection of linguistic expressions may be trained such that the sentences that satisfy the linguistic expressions have the correct label, and the sentences that do not satisfy the linguistic expressions do not have a label.

Figure 10:
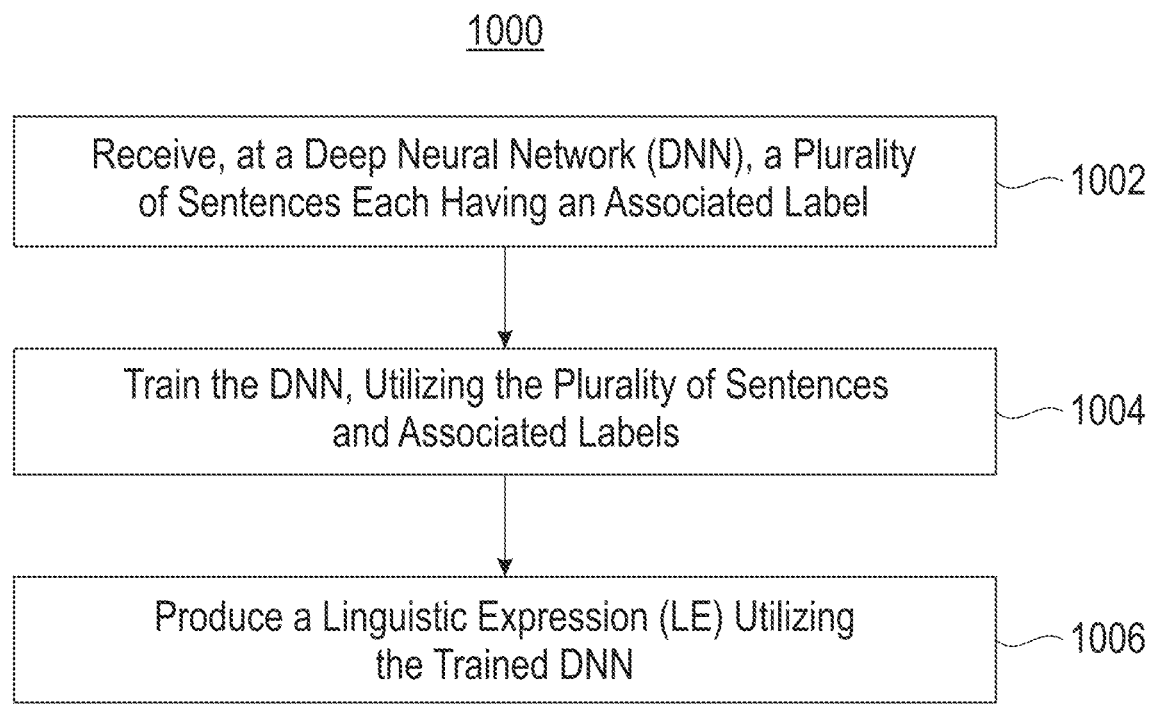
FIG. 10 illustrates a method for producing explainable rules via deep learning, in accordance with one embodiment of the present invention.

Now referring to FIG. 10, a flowchart of a method 1000 is shown according to one embodiment. The method 1000 may be performed in accordance with the present invention in any of the environments depicted in FIGS. 1-5, among others. Of course, greater or fewer operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 10, method 1000 may initiate with operation 1002, where a plurality of sentences each having an associated label is received at a deep neural network (DNN). In one embodiment, the plurality of labeled sentences may constitute training data for the DNN. In another embodiment, the plurality of labeled sentences may be received from a data store (e.g., one or more databases, etc.). In yet another embodiment, the plurality of labeled sentences may each include a plurality of words grouped in a predetermined format.

Additionally, in one embodiment, the plurality of labeled sentences may each include a subject and a predicate, and may convey a statement. In another embodiment, the DNN may include an artificial neural network (ANN) having multiple layers between an input layer and an output layer of the DNN. In yet another embodiment, the DNN may determine a mathematical manipulation to transform input into output. For example, the DNN may take a sentence as input, and may output an associated label for the sentence.

Further, in one embodiment, the plurality of labeled sentences may each include an instance of training data. In another embodiment, the associated label for each sentence may be pre-assigned. For example, the label may be determined for the sentence by one or more users.

Further still, in one embodiment, the associated label for each sentence may identify one or more aspects of the sentence. For example, the label may identify one or more characteristics of the sentence, one or more features of the sentence, etc. In another example, the label may confirm that the sentence includes one or more predetermined characteristics. In yet another example, the label may confirm that the sentence does not include one or more predetermined characteristics.

Also, method 1000 may proceed with operation 1004, where the DNN is trained utilizing the plurality of sentences and associated labels. In one embodiment, for each of the plurality of sentences, the DNN may be trained to determine and output the associated label for the sentence. In another embodiment, the DNN may be refined via iterative training.

For example, a subset of the plurality of labeled sentences may be input into the DNN. In another example, each sentence within the subset may be propagated through all layers of the DNN to determine a predicted label for the sentence. In yet another example, the predicted label for the sentence may be compared to the assigned label for the sentence to determine a computed error. In still another example, the computed error may be back-propagated through the DNN. In another example, the DNN may be adjusted to minimize the computed error.

In addition, method 1000 may proceed with operation 1006, where a linguistic expression (LE) is produced utilizing the trained DNN. In one embodiment, the DNN may be used to produce one or more linguistic expressions for the sentence, where the one or more linguistic expressions identify the associated label for the sentence. In another embodiment, the DNN may include a plurality of intermediate layers.

Furthermore, in one embodiment, each of the plurality of intermediate layers may correspond to a condition within a predictive model used to perform the determination of the label. In another embodiment, each condition within the predictive model may be derived from one of the plurality of intermediate layers. For example, the predictive model may include a linguistic expression (LE). In another example, a linguistic expression may include a rule that assigns a label to the sentence if each of the conditions within the linguistic expression are met.

Further still, in one embodiment, each of the conditions within the linguistic expression may correspond to a layer in the DNN, where the corresponding layer identifies a condition to include within the linguistic expression. In another embodiment, when training of the DNN is complete, each intermediate layer of the DNN may constitute a condition for the linguistic expression.

For example, each layer may be associated with a condition, and no two layers may be associated with the same condition. In another example, each layer may include all possible options for a predetermined condition and their associated probabilities. In yet another example, the option with the highest probability may be selected as a condition to be used within the linguistic expression.

Also, in one embodiment, the linguistic expression may be used to determine the associated label for the input sentence. In another embodiment, the linguistic expression may take the sentence as input and may produce the associated label as output. In yet another embodiment, linguistic expression may include a human-readable model.

For example, the linguistic expression may include a word-based rule model that includes one or more conditions and that is understandable by a human user. In another example, the one or more conditions of the linguistic expression may be applied to the sentence, and the results of such application may include the associated label for the sentence.

Additionally, in one embodiment, the linguistic expression may be applied to one or more sentences that do not have an associated label, utilizing one or more system resources. For example, for each of the one or more sentences, when each of the one or more conditions is met, the associated label may be assigned to the sentence. In another example, when one or more conditions is not met, an absence of the associated label may be assigned to the sentence.

For instance, the one or more conditions of the linguistic expression may determine whether an obligation exists within a sentence. In another example, the linguistic expression is applied to a sentence, and if each of the conditions of the linguistic expression are met for the sentence, the sentence is assigned a label indicating that an obligation exists within a sentence. In yet another example, if one or more of the conditions of the linguistic expression are not met for the sentence, the sentence is assigned a label indicating that an obligation does not exist within a sentence.

Further, in one embodiment, a plurality of linguistic expressions may be determined utilizing the trained DNN. In another embodiment, data instances other than a plurality of sentences may be used to train the DNN and determine the linguistic expression.

In this way, a linguistic expression (e.g., a predictive model) may be trained and produced utilizing a DNN trained with labeled sentences. This linguistic expression may be applied via a system other than the DNN to unlabeled sentences in order to assign a label to those sentences. Additionally, the linguistic expression produced by the DNN may be transparent utilizing first-order logic rules, such that the conditions within the linguistic expression may be easily readable and adjustable by a human or computing application/process. As a result, clarity of the linguistic expression produced by the DNN may be improved, and the linguistic expression may be more easily adjustable over time, which may improve a performance of such linguistic expression and may reduce an amount of computing resources (e.g., processing, storage, etc.) necessary to perform such adjustments of the linguistic expression. Further, the linguistic expression may be used to label unlabeled data in an efficient and expedited manner, which may reduce an amount of computing resources necessary to perform such labeling.

Figure 11:
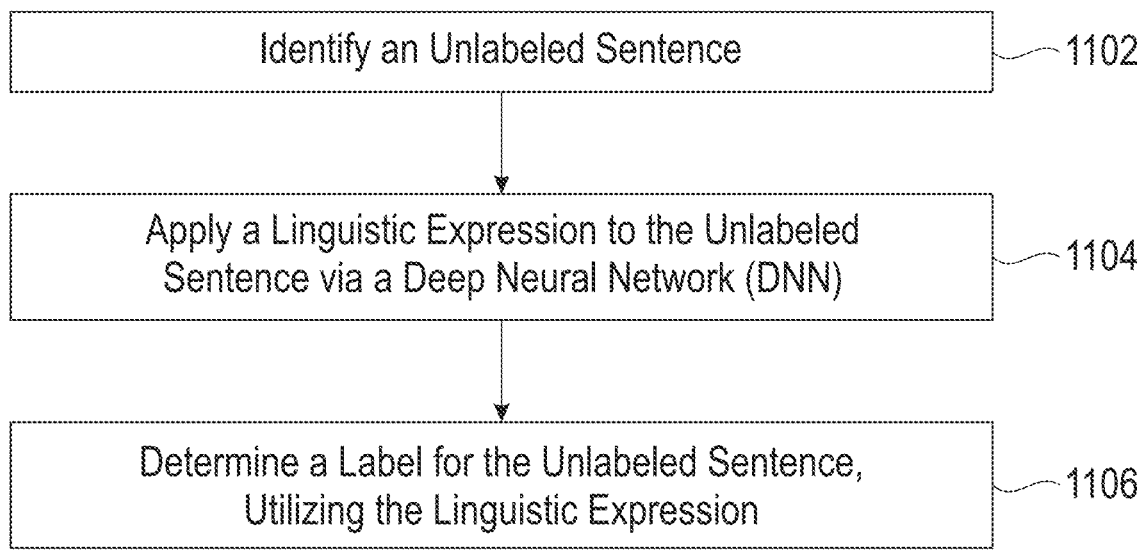
FIG. 11 illustrates a method for applying a linguistic expression, in accordance with one embodiment of the present invention.

Now referring to FIG. 11, a flowchart of a method 1100 for applying a linguistic expression is shown according to one embodiment. The method 1100 may be performed in accordance with the present invention in any of the environments depicted in FIGS. 1-5, among others. Of course, greater or fewer operations than those specifically described in FIG. 11 may be included in method 1100, as would be understood by one of skill in the art upon reading the present descriptions.

Each of the steps of the method 1100 may be performed by any suitable component of the operating environment. For example, in various embodiments, the method 1100 may be partially or entirely performed by one or more servers, computers, or some other device having one or more processors therein. The processor, e.g., processing circuit(s), chip(s), and/or module(s) implemented in hardware and/or software, and preferably having at least one hardware component, may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 11, method 1100 may initiate with operation 1102, where an unlabeled sentence is identified. In one embodiment, unlabeled sentence may include a sentence that does not have an associated label identifying one or more aspects of the sentence. In another embodiment, the unlabeled sentence may be retrieved from a data store, from one or more documents, etc.

Additionally, method 1100 may proceed with operation 1104, where a linguistic expression is applied to the unlabeled sentence via a deep neural network (DNN). In one embodiment, the linguistic expression may be produced using a trained DNN. In another embodiment, the trained DNN may be trained with labeled training data (e.g., a plurality of sentences with corresponding predetermined labels). In yet another embodiment, each condition within the linguistic expression may correspond to an intermediate layer within the trained DNN.

Further, method 1100 may proceed with operation 1106, where a label is determined for the unlabeled sentence, utilizing the linguistic expression. In one embodiment, each of the conditions within the linguistic expression may be applied to the unlabeled sentence to determine a label for the sentence. In another embodiment, if each of the conditions of the linguistic expression is met for the sentence, the sentence is assigned a label indicating that a predetermined characteristic exists within a sentence. In yet another embodiment, if one or more of the conditions of the linguistic expression are not met for the sentence, the sentence is assigned a label indicating that the predetermined characteristic does not exist within a sentence.

In this way, a linguistic expression may be used to determine a label for an unlabeled sentence.

Figure 12:
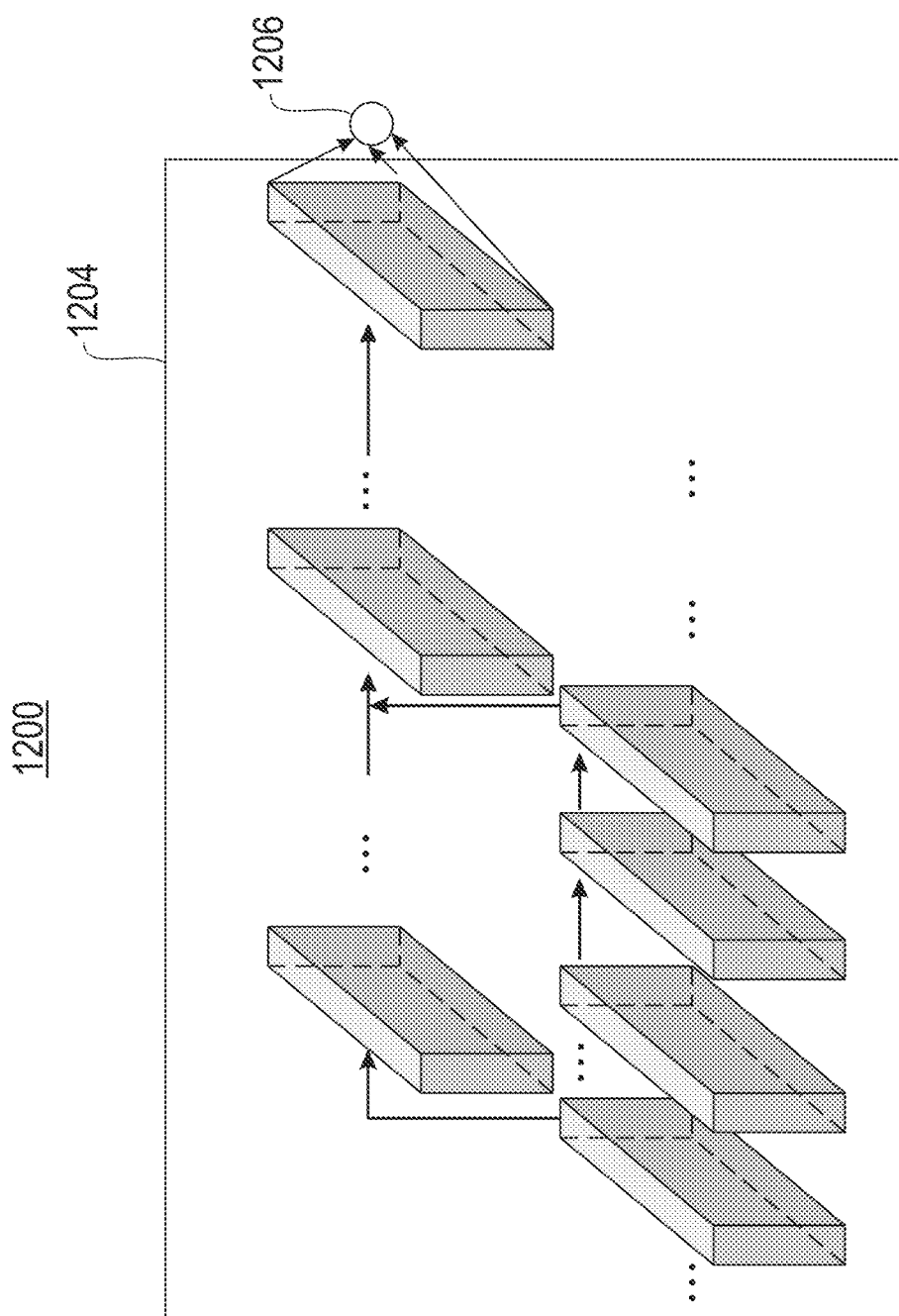
FIG. 12 illustrates an exemplary neural network architecture, in accordance with one embodiment of the present invention.

FIG. 12 illustrates an exemplary neural network architecture 1200, according to one exemplary embodiment. As shown, a sentence 1202 having an associated training label is used to train the layers 1204 of the DNN. In one embodiment, each of the layers 1204 corresponds to a condition within a predictive model used to perform the determination of a label 1206 for the sentence 1202. After receiving the sentence 1202, the layers 1204 of the DNN determine a predicted label 1206 for the sentence 1202.

In one embodiment, the predicted label 1206 may be compared to the training label associated with the sentence 1202. The results of the comparison may be back-propagated through the layers 1204 of the DNN, which may in turn be adjusted to minimize a difference between the predicted label 1206 and the training label. In this way, the layers 1204 of the DNN may be trained to produce a predictive model.

Figure 13:
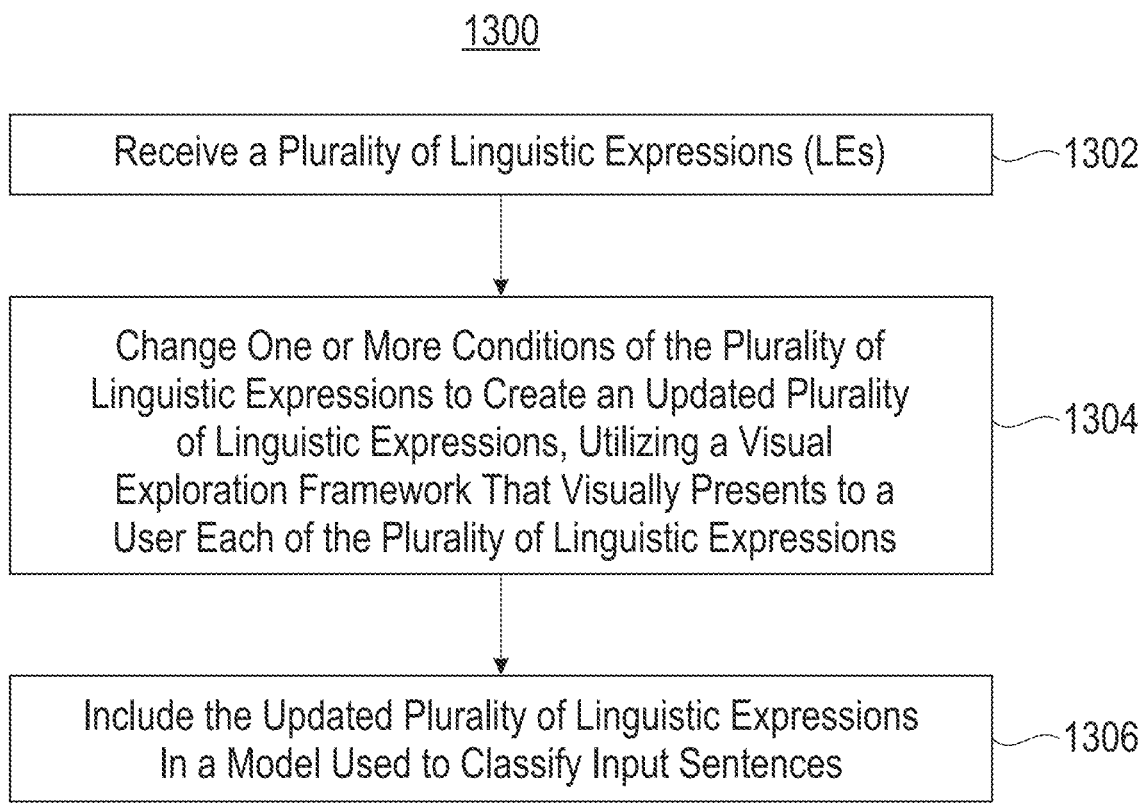
FIG. 13 illustrates a method for adjusting explainable rules using an exploration framework, in accordance with one embodiment of the present invention.

Now referring to FIG. 13, a flowchart of a method 1300 for adjusting explainable rules using an exploration framework is shown according to one embodiment. The method 1300 may be performed in accordance with the present invention in any of the environments depicted in FIGS. 1-5, among others. Of course, greater or fewer operations than those specifically described in FIG. 13 may be included in method 1300, as would be understood by one of skill in the art upon reading the present descriptions.

Each of the steps of the method 1300 may be performed by any suitable component of the operating environment. For example, in various embodiments, the method 1300 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 1300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 13, method 1300 may initiate with operation 1302, where a plurality of linguistic expressions (LEs) is received. In one embodiment, the plurality of linguistic expressions may be created utilizing a trained deep neural network (DNN). In one embodiment, the DNN may be trained utilizing a plurality of sentences and associated labels. For example, for each of the plurality of sentences, the DNN may be trained to determine and output the associated label for the sentence.

Additionally, in one embodiment, the plurality of labeled sentences may each include a subject and a predicate and may convey a statement. In another embodiment, associated label for each sentence may identify one or more aspects of the sentence (e.g., one or more characteristics of the sentence, one or more features of the sentence, etc.).

Further, in one embodiment, the DNN may be refined via iterative training. In another embodiment, the DNN may include an artificial neural network (ANN) having multiple layers between an input layer and an output layer of the DNN. In yet another embodiment, the DNN may include a plurality of intermediate layers, where each layer corresponds to a condition within a predictive model used to perform the determination of a label.

Further still, in one embodiment, each of the conditions within the linguistic expression may correspond to a layer in the DNN, where the corresponding layer identifies a condition to include within the linguistic expression. In another embodiment, when training of the DNN is complete, each intermediate layer of the DNN may constitute a condition for the linguistic expression. In yet another embodiment, each of the plurality of linguistic expressions may be used to conditionally assign a predetermined label to an input sentence.

For example, each of the plurality of linguistic expressions may be applied to one or more sentences that do not have an associated label. In another example, for each of the linguistic expressions, when each of the one or more conditions of the linguistic expression is met, the label associated with the linguistic expression may be assigned to the sentence.

Also, method 1300 may proceed with operation 1304, where one or more conditions of the plurality of linguistic expressions are changed, utilizing a visual exploration framework that visually presents to a user each of the plurality of linguistic expressions. In one embodiment, for each of the plurality of linguistic expressions, the conditions of the linguistic expression may be visually presented via the visual exploration framework. For example, each of the conditions may be presented in a user-readable fashion (e.g., using standardized grammar, etc.).

In addition, in one embodiment, for each of the plurality of linguistic expressions, the label assigned by the linguistic expression when the conditions of the linguistic expression are met may also be presented via the visual exploration framework. For example, each of the plurality of linguistic expressions may be associated with the same label. In another example, the label may be assigned to a sentence when one or more of the plurality of linguistic expressions contains conditions that are all met by the sentence. In yet another example, the plurality of linguistic expressions may be associated a plurality of different labels. For instance, the linguistic expressions may then be grouped by label for presentation via the visual exploration framework.

Furthermore, in one embodiment, upon selection of one of the presented linguistic expressions, one or more exemplary sentences may be presented via the visual exploration framework. For example, the sentences may be extracted from one or more predetermined documents (e.g., textual documents from which training data used to train the DNN was extracted, etc.). In another example, each of the sentences may meet the conditions of the selected linguistic expression (e.g., the selected linguistic expression may assign the label to the sentence when the sentence is provided as input). In yet another example, predetermined portions (e.g., words, phrases, etc.) of each of the sentences that trigger the conditions of the selected linguistic expression may be highlighted within the sentences.

Further still, in one embodiment, changes to one or more of the plurality of linguistic expressions may be received via the visual exploration framework. For example, a user may select one of the plurality of linguistic expressions using the visual exploration framework. In another example, the user may be presented with the conditions for the selected LE. In yet another example, the user may modify or remove one of the conditions for the selected LE. For example, changing one or more conditions of the plurality of linguistic expressions may include altering, via the visual exploration framework, a wording of a condition of the plurality of linguistic expressions to create an updated condition. In still another example, a result of the modification of the selected linguistic expression (e.g., a change in one or more performance statistics such as precision, recall, etc.) may be calculated and presented via the visual exploration framework.

Also, in one embodiment, the received changes may be implemented within one or more of the plurality of linguistic expressions. For example, each of the received changes may be implemented within the linguistic expressions to obtain adjusted linguistic expressions. In another embodiment, the adjusted linguistic expressions may be saved within the system.

Additionally, in one embodiment, one or more of the plurality of linguistic expressions may be removed using the visual exploration framework. For example, a user may select one or more of the plurality of linguistic expressions for removal via the selection of a predetermined icon the visual exploration framework. In another example, the selected one or more linguistic expressions may be removed from the plurality of linguistic expressions for the associated label. In yet another example, the user may view a result of the removal of one or more linguistic expressions (e.g., a change in one or more performance statistics such as precision, recall, etc.). For instance, a change in performance statistics of the updated plurality of linguistic expressions may be calculated and presented via the visual exploration framework.

Further, method 1300 may proceed with operation 1306, where the updated plurality of linguistic expressions is included in a format executable by a predetermined process to create a model used to classify input sentences. In one embodiment, each linguistic expression within the adjusted plurality of linguistic expressions may be codified into a format executable by a predetermined process. For example, the codified linguistic expressions may be used to create a learned model that is applied by the predetermined process to input sentences.

Further still, in one embodiment, each linguistic expression may be translated into a predetermined query language (e.g., annotation query language (AQL), etc.). For example, the learned model may be constructed using the translated linguistic expressions. In another embodiment, the learned model may be grouped and executed by a predetermined process within a system (e.g., utilizing a hardware processor, etc.).

Also, in one embodiment, the predetermined process may apply the each of the codified linguistic expressions within the learned model to input sentences to obtain labels for the sentences. For example, if an input sentence meets all conditions of a codified LE, the label associated with the codified linguistic expression may be assigned to the input sentence.

In this way, a performance of the learned model may be optimized using adjustments made via a visual exploration framework. Improving a performance of the learned model may reduce an amount of processing necessary to implement the learned model, which may improve a performance of one or more computing devices implementing the learned model. Additionally, the adjustment of the created linguistic expressions may be streamlined utilizing the visual exploration framework. For example, instead of manually applying and adjusting independently derived linguistic expressions to extracted sentences from one or more predetermined documents, linguistic expressions created using the DNN may be dynamically analyzed and presented for adjustment via the visual exploration framework. This may reduce the amount of error present in the resulting learned model, which may improve the performance of an implementation of the learned model by a computing device.

Now referring to FIG. 14, a flowchart of a method 1400 for implementing a visual exploration framework is shown according to one embodiment. The method 1400 may be performed in accordance with the present invention in any of the environments depicted in FIGS. 1-5, among others. Of course, greater or fewer operations than those specifically described in FIG. 14 may be included in method 1400, as would be understood by one of skill in the art upon reading the present descriptions.

Each of the steps of the method 1400 may be performed by any suitable component of the operating environment. For example, in various embodiments, the method 1400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 1400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 14, method 1400 may initiate with operation 1402, where a set of linguistic expressions (LEs) and a set of labeled data is received as input, where the linguistic expressions are logical combinations of predicates learned from the labeled data, and each data point in the labeled data comprises an instance of text and associated ground-truth labels. Additionally, method 1400 may proceed with operation 1404, where the linguistic expressions are presented in a visual exploration framework. Further, method 1400 may proceed with operation 1406, where a user is allowed to sort, filter, subset, and select LEs based on different criteria, utilizing the visual exploration framework. For example, the framework allows a human user to sort, filter, subset, and select linguistic expressions based on different criteria (e.g. a performance of the linguistic expressions over the labeled data).

Additionally, in one embodiment, the framework allows users to examine individual linguistic expressions. For each individual linguistic expression, the framework enables the user to inspect how the linguistic expression performs on an individual data point (e.g., by highlighting relevant portions of the text that matches the linguistic expression), manipulate the linguistic expression (e.g., by dropping or adding a predicate) to create a new LE, and evaluate the performance of the linguistic expression.

Further, in one embodiment, the framework allows users to select a subset of (possibly modified) linguistic expressions to form a model to perform the classification task.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    creating a plurality of linguistic expressions utilizing a deep neural network (DNN) that has been trained with training data, each of the linguistic expressions having one or more conditions therein;
    changing one or more of the conditions of the plurality of linguistic expressions to create an updated plurality of linguistic expressions;
    translating each of the updated linguistic expressions into a predetermined query language; and
    constructing a sentence classification model, utilizing the translated linguistic expressions,
    wherein changing the one or more conditions of the plurality of linguistic expressions includes altering, via a visual exploration framework, a wording of at least one condition of the plurality of linguistic expressions to create an updated condition.

2. The computer-implemented method of claim 1, further comprising:
    training the DNN utilizing a plurality of sentences and associated labels as training data.

3. The computer-implemented method of claim 1, wherein for each of the linguistic expressions, (i) conditions of the linguistic expression and (ii) a label assigned to a textual string by the linguistic expression when the conditions of the linguistic expression are met by the textual string are visually presented to a user via a visual exploration framework.

4. The computer-implemented method of claim 1, wherein upon selection by a user of one of the linguistic expressions presented to the user within a visual exploration framework, one or more exemplary sentences that satisfy the conditions listed within the linguistic expression are visually presented to the user via the visual exploration framework.

5. The computer-implemented method of claim 1, comprising removing one or more of the linguistic expressions via a visual exploration framework.

6. The computer-implemented method of claim 1, comprising calculating and displaying a change in performance statistics of the updated plurality of linguistic expressions via a visual exploration framework.

7. The computer-implemented method of claim 1, wherein each of a plurality of conditions within each of the linguistic expressions corresponds to a layer in the DNN, wherein each of said layers in the DNN identifies, based on the sentences and associated labels, the corresponding condition to include in the linguistic expression.

8. The computer-implemented method of claim 1, comprising:
    receiving, by the sentence classification model, an input sentence;
    determining, by the sentence classification model, that the input sentence meets all conditions of a predetermined linguistic expression; and
    assigning, by the sentence classification model to the input sentence, a label associated with the predetermined linguistic expression.

9. The computer-implemented method of claim 1, comprising, in response to a selection of one of the linguistic expressions within a visual exploration framework:
    extracting one or more exemplary sentences from one or more predetermined documents, wherein each of the one or more exemplary sentences meets the conditions of the selected linguistic expression; and
    highlighting predetermined portions of each of the one or more exemplary sentences that trigger conditions of the selected linguistic expression.

10. A computer program product comprising one or more computer readable storage media, and program instructions collectively stored on the one or more computer readable storage media, the program instructions comprising instructions configured to cause one or more processors to perform a method comprising:
    creating, by the one or more processors, a plurality of linguistic expressions, utilizing a deep neural network (DNN) trained with a plurality of sentences and associated labels as training data training data, at least some of the linguistic expressions having two or more conditions listed therein;
    changing, utilizing the one or more processors, one or more of the conditions of the plurality of linguistic expressions to create an updated plurality of linguistic expressions;
    translating, utilizing the one or more processors, each of the updated linguistic expressions into a predetermined query language; and
    constructing, utilizing the one or more processors, a sentence classification model, utilizing the translated linguistic expressions.

11. The computer program product of claim 10, comprising:
    training, by the one or more processors, the DNN utilizing the plurality of sentences and associated labels as the training data.

12. The computer program product of claim 10, wherein each of the linguistic expressions includes a rule that assigns a label to the sentence if each of the conditions within the linguistic expression are met, wherein for each of the linguistic expressions, (i) conditions of the linguistic expression and (ii) a label assigned by the linguistic expression when the conditions of the linguistic expression are met are visually presented to a user via a visual exploration framework.

13. The computer program product of claim 10, wherein upon selection by a user of one of the linguistic expressions presented to the user within a visual exploration framework, one or more exemplary sentences that satisfy the conditions listed within the linguistic expression are visually presented to the user via the visual exploration framework.

14. The computer program product of claim 10, wherein changing the one or more conditions of the plurality of linguistic expressions includes altering, via a visual exploration framework, a wording of at least one condition of the plurality of linguistic expressions to create an updated condition.

15. The computer program product of claim 10, comprising removing, utilizing the one or more processors, one or more of the linguistic expressions via a visual exploration framework.

16. The computer program product of claim 10, comprising calculating and displaying a change in performance statistics of the updated plurality of linguistic expressions via a visual exploration framework, utilizing the one or more processors.

17. The computer program product of claim 10, wherein each of a plurality of conditions within each of the linguistic expressions corresponds to a layer in the DNN, wherein each of said layers in the DNN identifies, based on the sentences and associated labels, the corresponding condition to include in the linguistic expression.

18. The computer program product of claim 10, comprising:
receiving, by the sentence classification model utilizing the one or more processors, an input sentence;
determining, by the sentence classification model utilizing the one or more processors, that the input sentence meets all conditions of a predetermined linguistic expression; and
assigning, by the sentence classification model to the input sentence utilizing the one or more processors, a label associated with the predetermined linguistic expression.

19. A system, comprising:
a processor; and
logic integrated with the processor, executable by the processor, or integrated with and executable by the processor, the logic being configured to:
create a plurality of linguistic expressions, utilizing a deep neural network (DNN) trained with training data, each of the linguistic expressions having one or more conditions therein listed in user-readable fashion within the linguistic expression;
change one or more conditions of the plurality of linguistic expressions by altering one or more of the linguistic expressions to create an updated plurality of linguistic expressions;
translate each of the updated linguistic expressions into a predetermined query language;
construct a sentence classification model, utilizing the translated linguistic expressions; and
assign a label associated with the linguistic expression to an unlabeled sentence in response to determining that the unlabeled sentence meets each of the conditions within the linguistic expression.

20. The system of claim 19, wherein the logic is configured to train the DNN utilizing a plurality of sentences and associated labels as the training data.

21. A computer-implemented method, comprising:
creating a plurality of linguistic expressions (LEs) by training a deep neural network (DNN) utilizing a plurality of labeled sentences, at least some of the linguistic expressions having a plurality of conditions therein, the conditions being derived from the labeled sentences,
wherein:
each of the plurality of labeled sentences includes a subject and a predicate,
each of the plurality of labeled sentences includes an associated label that identifies one or more characteristics of the sentence, and
each of the conditions within the linguistic expressions corresponds to a layer in the DNN;
changing one or more conditions of the plurality of linguistic expressions to create an updated plurality of linguistic expressions, utilizing a visual exploration framework (VEF) that visually presents to a user:
the linguistic expressions, and
for each of the presented linguistic expressions, a label assigned by the linguistic expression when the each of the conditions of the linguistic expression is met;
translating each of the updated linguistic expressions into a predetermined query language;
constructing a sentence classification model, utilizing the translated linguistic expressions; and
applying the sentence classification model to an input sentence, wherein each of the translated linguistic expressions within the sentence classification model is applied to the input sentence to obtain labels for the input sentence.

22. The method of claim 21, wherein each of the linguistic expressions includes a rule that assigns a label to the sentence if each of the conditions within the linguistic expression are met.

* * * * *